United States Patent [19]

Eder

[11] Patent Number: 4,492,618

[45] Date of Patent: Jan. 8, 1985

[54] METHOD OF DISINFECTING WATER, IN PARTICULAR SWIMMING POOL WATER

[76] Inventor: Bernd Eder, Eisgruberstrasse 10, München 82, Fed. Rep. of Germany, 8000

[21] Appl. No.: 580,067

[22] Filed: Feb. 14, 1984

[51] Int. Cl.³ .............................................. C25B 1/00
[52] U.S. Cl. .................................. 204/152; 204/149; 204/130; 204/131; 204/293; 210/169; 210/764
[58] Field of Search ...................... 210/169, 754, 764; 204/130–131, 149, 152, 293, 128

[56] References Cited

U.S. PATENT DOCUMENTS 3,222,269 12/1965 Stanton ................................. 204/98
3,351,542 11/1967 Oldershaw et al. ................. 204/128
4,256,552 3/1981 Sweeney ............................. 210/169

*Primary Examiner*—R. L. Andrews

[57] ABSTRACT

A method of disinfecting water wherein electrodes of a copper-silver alloy which are immersed in the water and the polarity of which is changed at certain intervals are connected to a direct current source for the production of copper and silver ions. Sodium persulfate is added to the water for oxidation of organic substances. Said method is especially useful for disinfecting swimming pool water resulting in an easily controllable and effective disinfection of the water without any damage to the human body.

11 Claims, No Drawings

METHOD OF DISINFECTING WATER, IN PARTICULAR SWIMMING POOL WATER

BACKGROUND OF THE INVENTION

The invention relates to a method of disinfecting water, in particular swimming pool water, where electrodes of a copper-silver alloy which are immersed in the water and whose polarity changes at certain intervals of time are connected to a direct current source for the production of copper and silver ions.

DESCRIPTION OF THE PRIOR ART

Disinfection by addition of active chlorine to water is a wide-spread measure that has been in use for a long time. If the dosage is right and if the quality of the crude water is known, the action of chlorine is sufficient. But if regular maintenance and constant water quality are not ensured, chlorination may fail. Another reason for the failure of the chlorination may be that the active chlorine is bound by a variety of organic substances and thus becomes inactive. The excess chlorine remaining after bactericidal action is slowly lost, so that a proportioned addition of chlorine is required continuously.

The addition of chlorine also has the disadvantage that the taste of the water is adversely affected and can lead to irritations of the mucous membranes. Moreover, recent studies have suggested that carcinogenic substances are produced by the addition of chlorine.

Further it is known that by copper and silver ions an oligodynamic sterilzation of water can be achieved. Tests have shown that the disinfecting action extends to bacteria, algae, bacilli, viruses and the like. In this connection copper has a stronger effect on the alga formation than silver. Compared with the use of chlorine, silver and copper have the advantage that their activity is in part preserved despite the binding by organic substances. The chlorine excess remaining after the destruction of the bacteria in the case of chlorination is gradually lost, whereas a copper and silver excess is preserved, so that copper and silver may become concentrated by absorption on vessel walls and pipelines. The use of copper and silver ions has the disadvantage that the desired disinfection is impaired by the fact that the required concentration of the produced copper and silver ions sets in only after a prolonged period of several days. In the case of swimming pool water this may have the consequence that during this period, due to the temperature rise occurring in many cases and due to the use of the swimming pool, a strong germ formation sets in and the subsequent treatment of the water with copper and silver ions does not lead to the desired success.

For these reasons it is necessary to support the disinfection with copper and silver ions by the addition of substances having a disinfecting action. The disinfecting action of hydrogen peroxide is known. Hydrogen peroxide, however, has the disadvantage that it is consumed very quickly and therefore long-term action cannot be obtained. The use of hydrogen peroxide leads to momentary action, which is finished after 5 to 6 hours. Effective use of hydrogen peroxide would lead to large consumption quantities. A special disadvantage is also the aggressivity of hydrogen peroxide, owing to which its use may be dangerous and may lead to damage to the human body, such as skin and eye irritations or allergies.

SUMMARY OF THE INVENTION

It is the object of the invention to develop the method of the initially mentioned kind in such a way that a readily checkable and safe disinfection of the water without any damage to the human body is ensured.

This prooblem is solved according to the invention in that sodium persulfate is added to the water for the oxidation of organic substances.

Appropriately there are added in the initial phase of the production of copper and silver ions about 60 to 100 g sodium persulfate per 10 $m^3$ water, while in normal operation a weekly addition of about 50 g sodium persulfate per 10 $m^3$ water is found to be favorable.

Should the pH value become too high in the course of the process, a pH-lowering substance, e.g. sulfuric acid, may be added to neutralize the water.

Under the influence of copper and silver ions, the use of sodium persulfate leads to the release of oxygen, thereby oxidizing organic substances which, for instance in swimming pools, may be introduced through the environment or the use of the swimming pool. As soon as a certain copper ion concentration has been reached, it is necessary to interrupt their further production, as too high a copper content leads to strong flocculation and green coloration of the liquid. Also in these cases the use of sodium persulfate supports the disinfecting action of the method.

DESCRIPTION OF PREFERRED EMBODIMENTS

The dosing and application of sodium persulfate are not critical, as it is not agressive and at too high a dosage a depot effect occurs, that is, the excess quantity of sodium persulfate is not consumed immediately, but only in accordance with the production of the copper and silver ions. Generally, however, sodium persulfate additions of 20 to 100 g/10 $m^3$ water per week are made.

At the beginning of the application of the method it is advisable to aid about 100 g sodium persulfate per 10 $m^3$ water, and in normal operation only about 50 g per 10 $m^3$ water a week. Only in case of severe burden or load on swimming pool water a sodium persulfate addition of 50 g/10 $m^3$ water twice weekly is advisable.

According to the method of the invention an optimum regulation of the pH value is possible, as a pH value rise harmful to the human body, which otherwise often occurs, is normally immediately adjusted to the neutral range by the acid resulting from the decomposition of the sodium persulfate addition. If too high a pH value should appear nevertheless, a suitable pH-lowering agent, e.g. sulfuric acid, may be added.

As practical tests over prolonged periods have shown, the proposed method is especially advantageous for the reason that there is no odor molestation, reddening of the eyes, ear inflammation, nose colds, skin disorders, allergies, foot fungi, irritations of the mucous membranes are avoided, the natural protective film of the skin is preserved, and by the produced silver ions the healing of wounds is promoted; the produced copper ions are also important for the formation of red blood cells and especially effective with respect to the control of algae.

An especially favorable ratio of silver and copper ions results at a copper/silver content of 80:20 to 90:10 percent by weight and a current of 50 to 120 mA, more particularly 60 to 100 mA. At a higher copper content the water may turn green.

EXAMPLE

To 50 m³ of freshly run swimming pool water are added 300 g sodium persulfate. The water is continually passed through a filter system, in the circulating line of which electrodes of a copper-silver alloy in the ratio 90 Cu/10 Ag are immersed into the water. With polarity changing at intervals of about 5 minutes, the electrodes are connected to a direct current source (100–120 mA; 12 V) for the production of Cu and Ag ions. The sodium persulfate addition is repeated twice weekly in a quantity of 20 g/10 m³ water each time.

While bathing was heavy during the summer months, the swimming pool water was tested continuously at regular intervals. The bacteriologic analysis showed complete absence of germs. There appeared no growth of algae of any kind and there were no signs of any irriation of the human body.

I claim:

1. A method of disinfecting water comprising the steps:
    (a) immersing electrodes of a copper-silver alloy in the water,
    (b) applying to the electrodes current from a direct current source and changing the polarity of the applied current at certain time intervals to produce copper and silver ions,
    (c) and adding sodium persulfate to the water to oxidize organic substances present in the water.

2. A method as claimed in claim 1, wherein during an initial phase of step(b), the quantity of sodium persulfate added per week is about 60–100 g per 10 m³ of water.

3. A method as claimed in claim 1 or 2, wherein during a later phase of step (b) constituting normal operation of the method, the quantity of sodium persulfate added per week is about 50 g per 10 m³ of water.

4. A method as claimed in claim 1 or 2, wherein a pH-reducing substance is added to the water for neutralization upon the pH value of the water exceeding a neutral value.

5. A method as claimed in claim 3, wherein a pH-reducing substance is added to the water for neutralization upon the pH value of the water exceeding a neutral value.

6. A method as claimed in claim 4, wherein the pH-reducing substance is sulfuric acid.

7. A method as claimed in claim 5, wherein the pH-reducing substance is sulfuric acid.

8. A method as claimed in claim 4, wherein only the added sodium persulfate is utilized for neutalization.

9. A method as claimed in claim 5, wherein only the added sodium persulfate is utilized for neutralization.

10. A method of disinfecting swimming pool water circulated through a filter system via connecting lines by immersing in the water circulating in one of the connecting lines copper-silver alloy electrodes across which is applied a direct current potential which changes at certain intervals to produce copper and silver ions, and adding to the water sodium persulfate in quantities sufficient to oxidize organic material present.

11. A method as set forth in claim 10 wherein the quantity of the sodium persulfate added is about 20–100 g/10 m³ water per week, and the copper-silver ratio of the electrodes varies between 80:20 and 90:10 percent by weight.

* * * * *